United States Patent
Doo et al.

(10) Patent No.: US 10,735,129 B2
(45) Date of Patent: Aug. 4, 2020

(54) BANDWIDTH ALLOCATION APPARATUS AND METHOD FOR PROVIDING LOW-LATENCY SERVICE IN OPTICAL NETWORK

(71) Applicant: ELECTRONICS AND TELECOMMUNICATIONS RESEARCH INSTITUTE, Daejeon (KR)

(72) Inventors: Kyeong Hwan Doo, Daejeon (KR); Kwang Ok Kim, Jeonju-si (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/208,867

(22) Filed: Dec. 4, 2018

(65) Prior Publication Data
US 2019/0356406 A1    Nov. 21, 2019

(30) Foreign Application Priority Data
May 15, 2018  (KR) .......................... 10-2018-0055537

(51) Int. Cl.
| H04B 10/272 | (2013.01) |
| H04J 14/08 | (2006.01) |
| H04J 14/02 | (2006.01) |
| H04Q 11/00 | (2006.01) |

(52) U.S. Cl.
CPC .......... H04J 14/0245 (2013.01); H04J 14/08 (2013.01); H04Q 11/0066 (2013.01); H04Q 11/0067 (2013.01)

(58) Field of Classification Search
CPC ........ H04B 10/272; H04J 14/088; H04J 14/08
See application file for complete search history.

(56) References Cited

U.S. PATENT DOCUMENTS

| 2006/0013138 | A1* | 1/2006 | Haran | H04J 3/1694 370/236 |
| 2006/0233197 | A1* | 10/2006 | Elmoalem | H04J 3/1694 370/468 |
| 2011/0129223 | A1 | 6/2011 | Yoo et al. | |
| 2016/0277142 | A1 | 9/2016 | Doo et al. | |

FOREIGN PATENT DOCUMENTS

| JP | 2011-146780 A | 7/2011 |
| JP | 5822857 B2 | 11/2015 |

OTHER PUBLICATIONS

Saki Hatta, et al. "Implementation of Ultra-Low Latency Dynamic Bandwidth Allocation Method for TDM-PON", IEICE Communications Express, vol. 1, 1-6, Sep. 2016.

* cited by examiner

*Primary Examiner* — Shi K Li
(74) *Attorney, Agent, or Firm* — LRK Patent Law Firm

(57) ABSTRACT

A bandwidth allocation apparatus and method for providing a low-latency service in an optical network that may guarantee low-latency requirements and improve a network utilization rate by allocating a static bandwidth to an ONU requiring low latency within an allocable bandwidth and by allocating a dynamic bandwidth to an ONU not requiring the low latency within a remaining bandwidth.

14 Claims, 6 Drawing Sheets

| SLA table | | | | | | |
|---|---|---|---|---|---|---|
| ONU1 | RTT | Class1 | Class2 | Class3 | ⋯ | ClassN |
| ONU2 | RTT | Class1 | Class2 | Class3 | ⋯ | ClassN |
| ONU3 | RTT | Class1 | Class2 | Class3 | ⋯ | ClassN |
| ⋮ | ⋮ | ⋮ | ⋮ | ⋮ | | ⋮ |
| ONUM | RTT | Class1 | Class2 | Class3 | ⋯ | ClassN |

BANDWIDTH ALLOCATION APPARATUS AND METHOD FOR PROVIDING LOW-LATENCY SERVICE IN OPTICAL NETWORK

CROSS-REFERENCE TO RELATED APPLICATION(S)

This application claims the priority benefit of Korean Patent Application No. 10-2018-0055537, filed on May 15, 2018 in the Korean Intellectual Property Office, the disclosure of which is incorporated herein by reference for all purposes.

BACKGROUND

1. Field of the Invention

One or more example embodiments relate to a bandwidth allocation apparatus and method for providing a low-latency service in an optical network, and more particularly, to technology for allocating a bandwidth to each optical network unit (ONU) in an optical network using a time division multiplexer (TDM).

2. Description of Related Art

A passive optical network (PON) refers to a network between a subscriber and a central office in which at least one optical network unit (ONU) is connected to a single optical line terminal (OLT) in a 1:n structure. The PON is established to provide a high-speed Internet service in, for example, a house, an apartment, and a building, and is gradually expanding its coverage to backhaul and fronthaul networks of a base station with price competitiveness.

To accommodate a 5G service including a future large-capacity super-realistic service in the PON, speed and low-latency requirements need to be met. Such a service may vary based on standards, however, require a latency of 0.1 to 1 milli-seconds (ms) including wired/wireless transmission intervals. A latency characteristic in the PON refers to a time from a point in time at which a packet is input to an ONU of a subscriber to a point time at which the packet is output to a core network through the OLT. In the PON, downstream uses a broadcast scheme and thus the latency characteristic is insignificant. On the contrary, upstream uses a time division multiplexing (TDM) scheme and thus the latency characteristic increases based on a number of ONUs and a traffic amount. When the number of ONUs and the traffic amount are used restrictively, the latency characteristic may decrease, which may lead to a decrease in a network utilization rate and an increase in cost.

SUMMARY

At least one example embodiment provides an apparatus and method that may guarantee low-latency requirements and may improve a network utilization rate by allocating a static bandwidth to an optical network unit (ONU) requiring low latency within an allocable bandwidth and by allocating a dynamic bandwidth to an ONU not requiring the low latency within a remaining bandwidth.

According to an aspect, there is provided a bandwidth allocation method performed by a bandwidth allocation apparatus included in an optical line terminal (OLT), the method including receiving a report message requesting a bandwidth allocation from an optical network unit (ONU) performing a low latency not-required service among one or more ONUs connected to the OLT; generating a virtual report message per cycle time for bandwidth allocation for an ONU performing a low latency required service among the one or more ONUs connected to the OLT; generating a request message for the bandwidth allocation by referring to a service level agreement (SLA) table of an ONU corresponding to the received report message or the generated virtual report message; sequentially identifying the generated request message per cycle time, and performing a static bandwidth allocation (SBA) with respect to the ONU performing the low latency required service and performing a dynamic bandwidth allocation (DBA) with respect to the ONU performing the low latency not-required service; and allocating a transmission bandwidth through the SBA or the DBA to the one or more ONUs using a grant message. The allocating of the transmission bandwidth includes preferentially allocating a static bandwidth through the SBA within an allocable bandwidth corresponding to the cycle time and allocating a dynamic bandwidth through the DBA with respect to a remaining bandwidth.

The ONU may be configured to include a different queue for each service having priority and to store uplink data for each queue, and the SLA table may be set based on at least one of a credit of a queue for performing the SBA among a plurality of queues included in each of the one or more ONUs connected to the OLT, a credit of a queue for performing the DBA, and a round trip time (RTT) of each of the report message and the grant message.

The generating of the request message may include generating a first request message for each ONU performing the low-latency required service using a virtual report message that is generated based on a credit of a queue for performing the SBA included in the SLA table per cycle time; and generating a second request message for each ONU performing the low-latency not-required service based on a credit of a queue for performing the DBA included in the SLA table and the received report message.

The allocating of the transmission bandwidth may include allocating the static bandwidth through the SBA with respect to each ONU performing the low-latency required service in response to the generated first request message, and determining a total sum of the allocated static bandwidths not to exceed the allocable bandwidth corresponding to the cycle time.

The allocating of the transmission bandwidth may include allocating the dynamic bandwidth through the DBA with respect to each ONU performing the low-latency not-required service in response to the generated second request message, and determining the allocated dynamic bandwidth based on the allocable bandwidth corresponding to the cycle time.

The allocating of the transmission bandwidth may include dividing the determined dynamic bandwidth based on an end point in time of the allocable bandwidth when the dynamic bandwidth determined for a single ONU among the ONUs to which the dynamic bandwidth is allocated through the DBA exceeds the allocable bandwidth, and determining a dynamic bandwidth before the end point in time as a transmission bandwidth for the single ONU, and the generating of the request message may include generating a third request message for reallocating a dynamic bandwidth after the end point in time to the single ONU.

The allocable bandwidth may be set based on an integer multiple of the cycle time.

According to an aspect, there is provided a bandwidth allocation apparatus included in an OLT, the bandwidth allocation apparatus including a communication module configured to receive a report message requesting a bandwidth allocation from an ONU performing a low latency not-required service among one or more ONUs connected to the OLT, and to transmit, to the one or more ONUs, a grant message including a transmission bandwidth allocated in response to the report message; a report manager configured to generate a virtual report message per cycle time for bandwidth allocation for an ONU performing a low latency required service among the one or more ONUs connected to the OLT, and to generate a request message for the bandwidth allocation by referring to an SLA table of an ONU corresponding to the received report message or the generated virtual report message; and a bandwidth allocator configured to sequentially identify the generated request message per cycle time, and to perform an SBA with respect to the ONU performing the low latency required service and to perform a DBA with respect to the ONU performing the low latency not-required service. The bandwidth allocator is configured to preferentially allocate a static bandwidth through the SBA within an allocable bandwidth corresponding to the cycle time and to allocate a dynamic bandwidth through the DBA with respect to a remaining bandwidth.

The ONU may be configured to include a different queue for each service having priority and to store uplink data for each queue, and the SLA table may be set based on at least one of a credit of a queue for performing the SBA among a plurality of queues included in each of the one or more ONUs connected to the OLT, a credit of a queue for performing the DBA, and a round trip time (RTT) of the report message and the grant message, and may be stored in a memory The report manager may be configured to generate a first request message for each ONU performing the low-latency required service using a virtual report message that is generated based on a credit of a queue for performing the SBA included in the SLA table per cycle time, and to generate a second request message for each ONU performing the low-latency not-required service based on a credit of a queue for performing the DBA included in the SLA table and the received report message.

The bandwidth allocator may be configured to allocate the static bandwidth through the SBA with respect to each ONU performing the low-latency required service in response to the generated first request message and to determine a total sum of the allocated static bandwidths not to exceed the allocable bandwidth corresponding to the cycle time.

The bandwidth allocator may be configured to allocate the dynamic bandwidth through the DBA with respect to each ONU performing the low-latency not-required service in response to the generated second request message, and to determine the allocated dynamic bandwidth based on the allocable bandwidth corresponding to the cycle time.

The bandwidth allocator may be configured to divide the determined dynamic bandwidth based on an end point in time of the allocable bandwidth when the dynamic bandwidth determined for a single ONU among the ONUs to which the dynamic bandwidth is allocated through the DBA exceeds the allocable bandwidth corresponding to the cycle time, and to determine a dynamic bandwidth before the end point in time as a transmission bandwidth for the single ONU, and the report manager may be configured to generate a third request message for reallocating a dynamic bandwidth after the end point in time to the single ONU.

The allocable bandwidth may be set based on an integer multiple of the cycle time.

According to an aspect, there is provided a bandwidth allocation method performed by a bandwidth allocation apparatus of an ONU connected to an OLT, the method including storing uplink data for each queue by including a different queue for each service having priority; transmitting a request message requesting a bandwidth allocation to the OLT based on the stored uplink data; receiving a grant message including a transmission bandwidth that is allocated in response to the transmitted request message; and transmitting the stored uplink data in response to the received grant message. The grant message includes a transmission bandwidth allocated by performing an SBA with respect to ONUs performing a low-latency required service and performing a DBA with respect to ONUs performing a low-latency not-required service within an allocable bandwidth corresponding to a cycle time for bandwidth allocation.

The transmission bandwidth may be allocated by allocating the static bandwidth through the SBA with respect to each of the ONUs performing the low-latency required service, and by determining a sum of the allocated static bandwidths not to exceed the allocable bandwidth corresponding to the cycle time.

The transmission bandwidth may be allocated by allocating the dynamic bandwidth through the DBA with respect to each of the ONUs performing the low-latency not-required service, and by determining the allocated dynamic bandwidth based on the allocable bandwidth corresponding to the cycle time.

The transmission bandwidth may be allocated by dividing the determined dynamic bandwidth based on an end point in time of the allocable bandwidth when the dynamic bandwidth determined for a single ONU among the ONUs to which the dynamic bandwidth is allocated through the DBA exceeds the allocable bandwidth, and by determining a dynamic bandwidth before the end point in time as a transmission bandwidth for the single ONU.

According to an aspect, there is provided a bandwidth allocation apparatus of an ONU connected to an OLT, the bandwidth allocation apparatus including a memory configured to store uplink data for each queue by including a different queue for each service having priority; and a processor configured to process the uplink data stored in the memory. The processor is configured to transmit a request message requesting a bandwidth allocation to the OLT based on the stored uplink data, to receive a grant message including a transmission bandwidth that is allocated in response to the transmitted request message, and to transmit the stored uplink data in response to the received grant message. The grant message includes a transmission bandwidth allocated by performing an SBA with respect to ONUs performing a low-latency required service and performing a DBA with respect to ONUs performing a low-latency not-required service within an allocable bandwidth corresponding to a cycle time for bandwidth allocation.

The transmission bandwidth may be allocated by allocating the static bandwidth through the SBA with respect to each of the ONUs performing the low-latency required service, and by determining a sum of the allocated static bandwidths not to exceed the allocable bandwidth corresponding to the cycle time, and may also be allocated by allocating the dynamic bandwidth through the DBA with respect to each of the ONUs performing the low-latency not-required service, and by determining the allocated dynamic bandwidth based on the allocable bandwidth corresponding to the cycle time.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
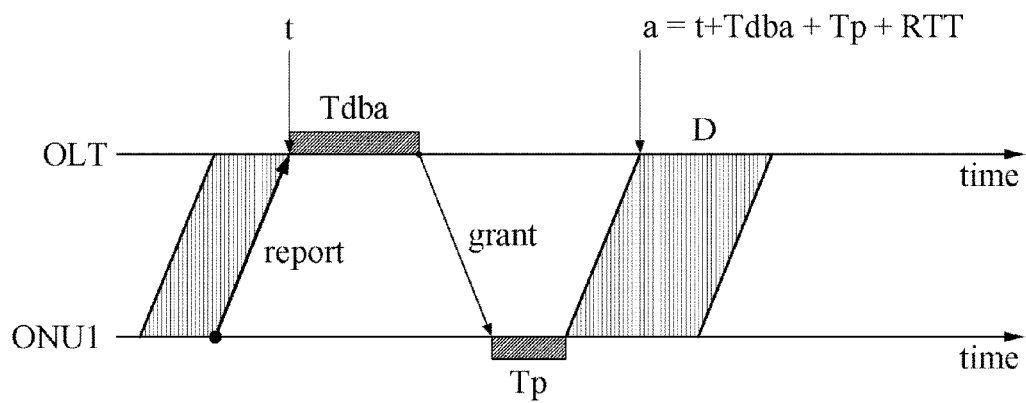
FIG. 1 illustrates an example of a cycle of a status report scheme.

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Figure 2:
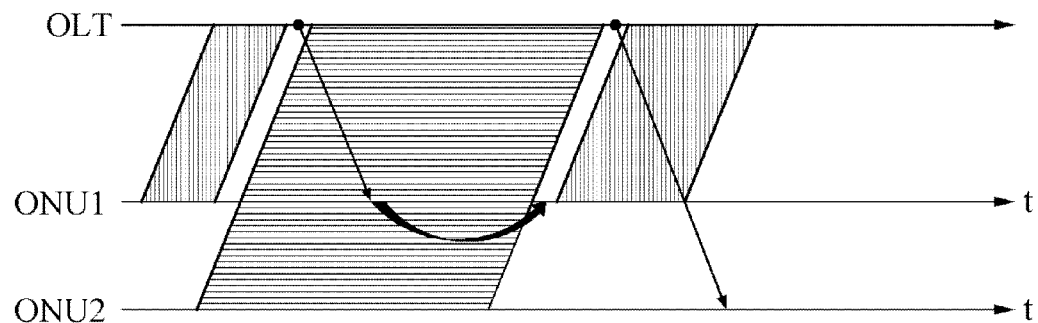
FIG. 2 illustrates an example of a relationship between a burst size and a latency characteristic.

FIG. 1 illustrates an example of a cycle of a status report scheme and FIG. 2 illustrates an example of a relationship between a burst size and a latency characteristic.

A scheme of allocating a bandwidth to an optical network unit (ONU) includes a static bandwidth allocation (SBA) scheme of allocating a desired bandwidth length regardless of a traffic amount of the ONU and a dynamic bandwidth allocation (DBA) scheme of changing a bandwidth length to be allocated based on the traffic amount of the ONU. The SBA scheme uses a non-status reporting (NSR) scheme of allocating a determined bandwidth without monitoring an amount of data to be transmitted in the ONU. Dissimilar thereto, the DBA scheme uses a status reporting (SR) scheme of reporting an amount of ONU data to an optical line terminal (OLT) and determining a bandwidth length to be allocated based on the reported amount of ONU data. Accordingly, the SBA scheme has an excellent latency characteristic, however, has a low network utilization rate. On the contrary, the DBA scheme has a relatively poor latency characteristic, however, has a high network utilization rate.

In a passive optical network (PON), delay occurs mainly due to a fiber propagation delay that is an optical cable transmission time and an in-ONU buffer delay occurring based on a time division multiplexing (TDM) scheme. Here, the fiber propagation delay may not be reduced. Thus, to improve a latency characteristic in the PON, the buffer delay in the ONU needs to be reduced. The buffer delay may occur due to the following two factors.

As a first factor, the delay may occur due to an SR-based transmission scheme as shown in FIG. 1. Once traffic is input to an ONU, an ONU may report an amount of data to be transmitted from a buffer to the OLT using a report message. The OLT may transmit, to the ONU through a grant message, a traffic transmission time and a bandwidth allocation length based on a bandwidth length calculation time (Tdba), a message transmission time through an optical cable, that is, a round trip time (RTT), and a transmission preparation time (Tp) of the ONU. The ONU may transmit traffic in an uplink, that is, to the OLT based on the allocated traffic transmission time and bandwidth length. Accordingly, the ONU needs to store traffic data input to the buffer until the ONU transmits the report message to the OLT and receives the grant message from the OLT (Tdba+Tp+RTT).

A second factor is a burst size that is a transmission length of the ONU. The bandwidth allocation length that is allowed for the ONU may be determined as the burst size. As a burst size for ONUs increases, an interval in which the grant message is received may increase and a buffer delay may also increase. Referring to FIG. 2, as a burst size increases, a buffer delay increases. When a bandwidth allocation length of ONU2 is greater than that of ONU1, a transmission start time of ONU1 is delayed until transmission of ONU2 is completed and a corresponding buffer delay increases.

Figure 3:
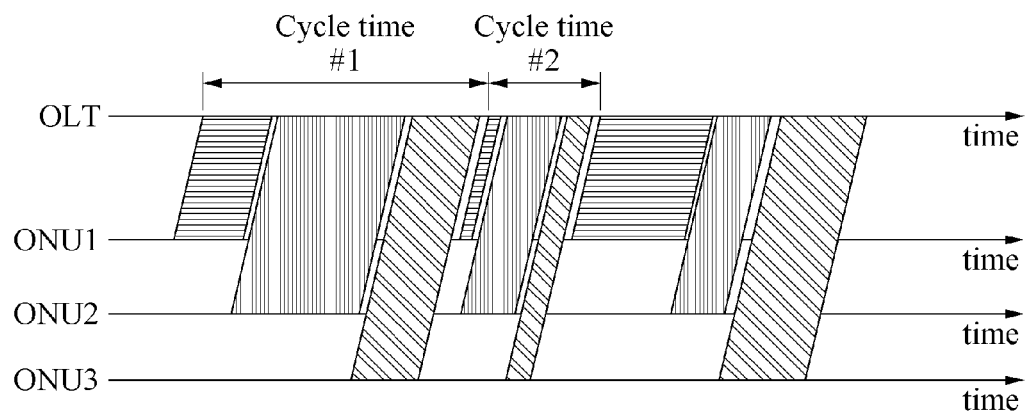
FIG. 3 illustrates an example of a variable cycle time.

FIG. 3 illustrates an example of a variable cycle time.

A service rate of an ONU is determined based on a transmission bandwidth in which a predetermined period of time is allocated, and thus an interval in which a grant message is received may not be important. However, a transmission bandwidth allocation interval may be important to enhance a latency characteristic, which will be described with reference to FIG. 3. A cycle time refers to a duration of time from a traffic transmission start time to a next traffic transmission start time of the same ONU or a duration of time from a report message reception time to a subsequent report message reception time of the same ONU. Accordingly, the cycle time is a transmission bandwidth allocation interval of the ONU. When it is assumed that a bandwidth is allocated to each of all ONUs once within a single cycle, a length of a cycle time is determined based on a bandwidth allocation length. Therefore, when a total sum of burst sizes of all the ONUs within a single cycle is adjusted not to exceed a predetermined period of time, latency characteristics of the ONUs may be controlled to be a cycle time level. However, as the cycle time decreases, redundancy may increase, which may degrade traffic throughput.

Figure 4:
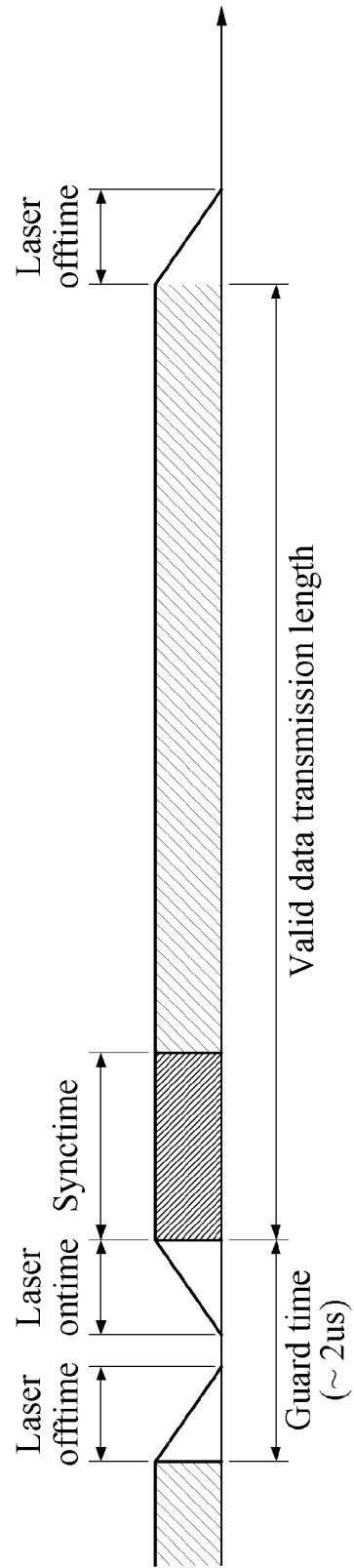
FIG. 4 illustrates a format of an optical network unit (ONU) burst frame.

FIG. 4 illustrates a format of an ONU burst frame.

A guard time is required for burst transmission of an ONU and burst reception of an OLT. The guard time includes a laser off-time at which a laser is turned off, a laser on-time at which the laser is turned on, and a sync time for clock recovery. Irrespective of a valid data transmission length, a guard time of 1 to 2 μs may be required per burst.

For example, when it is assumed that the number of ONUs is 64, a maximum cycle time is 1000 μs, and a guard time is 2 μs, a maximum allocation time per ONU may be 15.6 μs and an actual data transmission time per ONU may be 13.6 μs. Here, when the cycle time is reduced from 1000 μs to 500 us, the maximum allocation time per ONU may be 7.8 μs and the actual data transmission time may be 5.8 us. Here, when a value acquired by dividing the actual data transmission time by the maximum allocation time per ONU is regarded as a transmission efficiency, the transmission efficiency is 0.87 if cycle time=1000 μs and is 0.74 if cycle time=500 μs. Accordingly, as the cycle time decreases, the latency characteristic may be enhanced and, at the same time, the traffic throughput may be degraded.

Figures 5, 6:
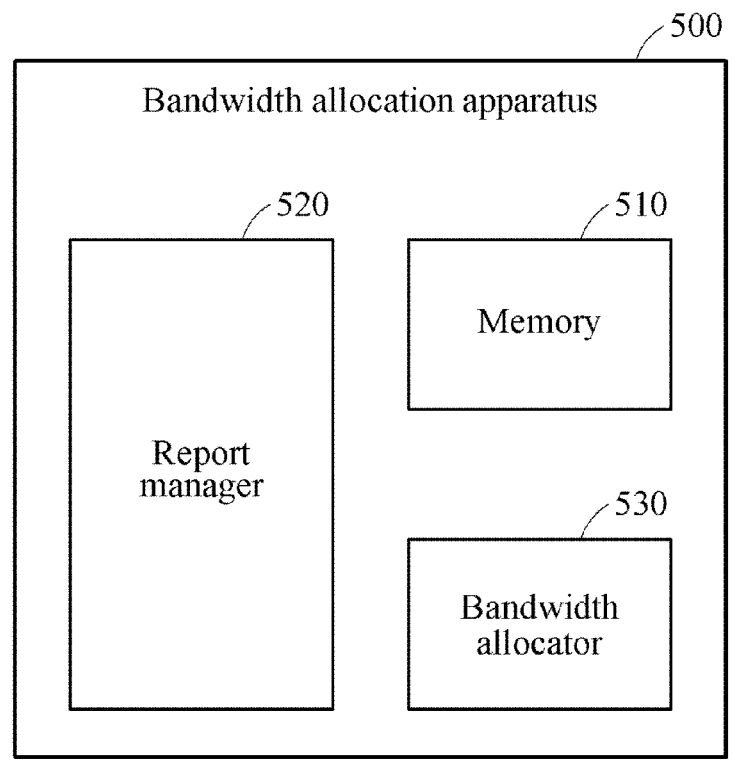
FIG. 5 is a diagram illustrating a configuration of a bandwidth allocation apparatus according to an example embodiment.
FIG. 6 illustrates an example of a service leverage agreement (SLA) table according to an example embodiment.

FIG. 5 is a diagram illustrating a configuration of a bandwidth allocation apparatus according to an example embodiment.

An ONU that is applied to a backhaul and a fronthaul of a base station needs to meet the low-latency requirements based on a standard. When an ONU requiring a low-latency and an ONU not requiring the low-latency are present in a single PON based on a usage purpose thereof, a bandwidth allocator included in the same OLT needs to manage the ONUs. The ONUs may be distinguished based on installation sites of the corresponding ONUs or types of services provided from the corresponding ONUs. A service level agreement (SLA) table of the OLT may be set based on the same to limit attributes and speeds, etc., of the services provided from the ONUs.

For example, an ONU installed at a location of a mobile communication base station, a subscriber requiring a business service, etc., may corresponds to an ONU that performs a low-latency required service. Accordingly, the SLA table may include whether a queue for each service having a priority is used, a maximum service rate for each service having priority, etc., with respect to each ONU. For example, it is assumed that all of ONUs may support four service queues Q1, Q2, Q3, and Q4, Q1 is designed to operate with an SBA for a low-latency required service and Q2, Q3, and Q4 are designed to operate with a DBA for a low-latency not-required service. In this example, when ONU_A uses Q1 and Q4 as an ONU performing the low-latency required service and ONU_B uses Q2, Q3, and Q4 as an ONU performing the low-latency not-required service, a bandwidth may be allocated only to a credit-assigned class in a bandwidth allocation by assigning credits to Q1 and Q4 of ONU_A and by assigning a credit to Q2, Q3, and Q4 of ONU_B in the SLA table. Here, the class Q1 may operate through the SBA and Q2, Q3, and Q4 may operate through the DBA.

That is, examples of an ONU to which the bandwidth allocation scheme disclosed herein is applied may include an ONU that performs a low-latency required service, an ONU that performs a low-latency not-required service, and an ONU that simultaneously performs the low-latency required service and the low-latency not-required service.

The bandwidth allocation scheme according to an example embodiment relates to a scheme of preferentially guaranteeing a latency characteristic and a bandwidth by allocating a static bandwidth within a predetermined interval to the ONU that performs the low-latency required service and allocating a dynamic bandwidth using a remaining bandwidth to the ONU that does not performing the low-latency not required service.

In the PON to which dozens of ONUs are connected, a traffic amount varies in real time. Therefore, when another ONU uses a bandwidth unused by any one ONU, a network utilization rate may increase. In this case, the DBA scheme is very effective. When a traffic amount exponentially increases, a buffer delay may increase and a packet may need to be discarded, which may lead to increasing a latency characteristic. Accordingly, the SBA scheme may be the easiest method in terms of satisfying the latency characteristic regardless of a traffic status, however, may be very ineffective in terms of network management since a network utilization rate decreases. The example embodiments propose a new method in which advantages of the SBA scheme and the DBA scheme are integrated, that is, a method that may enhance the network utilization rate and may also guarantee the latency characteristic at the same time.

Referring to FIG. 5, a bandwidth allocation apparatus 500 may include a memory 510, a report manager 520, and a bandwidth allocator 530. All of ONUs include N queues. For example, Class1 may include an SBA exclusive queue and remaining queues Class2 to ClassN may include DBA management queues. Each of the ONUs may set a number of classes used for a corresponding ONU, a static allocation length (class1 credit) of Class1, a maximum allocation length (Class2~ClassN credit) for each DBA management class, and an SBA allocation period (allocable bandwidth corresponding to a cycle time) based on a service level. Here, when each ONU joins a service, a required minimum rate, a maximum rate, etc., may be determined and values corresponding thereto may be set by a user.

Here, the DBA may be applied to a remaining bandwidth excluding a static bandwidth allocated through the SBA in the entire allocation bandwidth. Accordingly, a total sum of static allocation lengths of Class1 associated with all of the ONUs needs to be set not to exceed the SBA allocation period.

FIG. 6 illustrates an example of an SLA table according to an example embodiment. Referring to FIG. 6, the SLA table may include an independent table for each ONU. The SLA table may store, for example, a credit for each of Class1, Class2, ... ClassN corresponding to a service level and an RTT for each ONU. Class1 may be a credit used to allocate a predetermined static bandwidth per SBA allocation period. Thus, the user may determine a separate SBA allocation period. Class2 to ClassN may be credits allocable for the respective DBA management classes. Although a traffic amount reported when the bandwidth allocation apparatus 500 performs the DBA is greater than the maximum allocation credits of Class2~ClassN, a bandwidth length to be allocated may be limited based on the credits.

That is, the SLA table may be set based on at least one of a credit of a queue for performing the SBA among a plurality of queues included in each of one or more ONUs connected to an OLT, a credit of a queue for performing the DBA, and an RTT of a report message and a grant message and thereby stored in the memory 510.

The report manager 520 may receive a report message requesting a bandwidth allocation from an ONU performing a low-latency not required service among the one or more ONUs connected to the OLT through a communication module (not shown). Also, the report manager 520 may generate a virtual report message per cycle time for bandwidth allocation for an ONU performing a low-latency required service among the one or more ONUs connected to the OLT.

The report manager 520 may generate a request message for the bandwidth allocation by referring to an SLA table of an ONU corresponding to the received report message or the generated virtual report message. In detail, the report manager 520 may include a virtual report management module, a received report management module, and a divided report management module, and may perform a management function, such as generate, store, and output a request message required by the bandwidth allocator 530, for each report management module.

Here, the request message may be output in order of the virtual report management module, the divided report management module, and the received report management module. That is, when a virtual report message stored in a memory within the virtual report management module is output in a form of a first request message, a divided report message stored in a memory within the divided report management module may be output in a form of a third request message. When the memory within the divided report management module is empty, a report message stored in a memory within the received report management module may be output in a form of a second request message.

The virtual report management module may generate a virtual report message for each ONU based on a credit corresponding to Class1 of the SLA table per cycle time for bandwidth allocation and may store the generated virtual report message in the memory of the virtual report management module based on a first-in first-out (FIFO) basis. Also, the virtual report management module may sequentially output the virtual report message from the memory per cycle time and may transmit the virtual report message to the bandwidth allocator 530 in a form of the first request message. The virtual report message has a top priority among report messages and, thus may be processed most initially per cycle time. The virtual report management module serves to simplify an algorithm so that the bandwidth allocator 530 may calculate a bandwidth length to be allocated based on a report unit.

The received report management module may store a report message received from each of ONUs performing a low-latency not-required service in the memory based on a FIFO basis. In response to receiving an output request, the received report management module may generate the second request message based on the credits corresponding to Class2~ClassN of the SLA table and the report message stored in the memory and may transmit the second request message to the bandwidth allocator 530.

When the second request message output from the received report management module is not completely processed by the bandwidth allocator 530 with respect to a requested bandwidth and is divided, the divided report management module may generate a divided report message using a bandwidth remaining after allocation and may store the generated divided report message in the memory of the divided report module based on a FIFO basis. In response to receiving an output request, the divided report management module may sequentially output the divided report message stored in the memory and may transmit the divided report message to the bandwidth allocator 530 in a form of the third request message.

Referring again to FIG. 5, the bandwidth allocator 530 may sequentially process request messages output from the report manager 520 one by one at a start point in time of each cycle time. In detail, the bandwidth allocator 530 may complete an SBA operation using the first request message received from the virtual report management module and may allocate a static bandwidth to each of ONUs performing the low-latency required service. Once the first request message is all processed, the bandwidth allocator 530 may complete a DBA operation using the third request message received from the divided report management module and may allocate a dynamic bandwidth to each of ONUs performing the low-latency not required service. The bandwidth allocator 530 may complete the DBA operation using the second request message received from the received report management module and may allocate a dynamic bandwidth to each of the ONUs performing the low-latency not-required service. Here, the bandwidth allocator 530 may allocate, to a corresponding ONU, a relatively small value between a bandwidth length requested in the second request message or the third request message received from the report manager 520 and a credit for each class of an SLA table.

Figure 7:
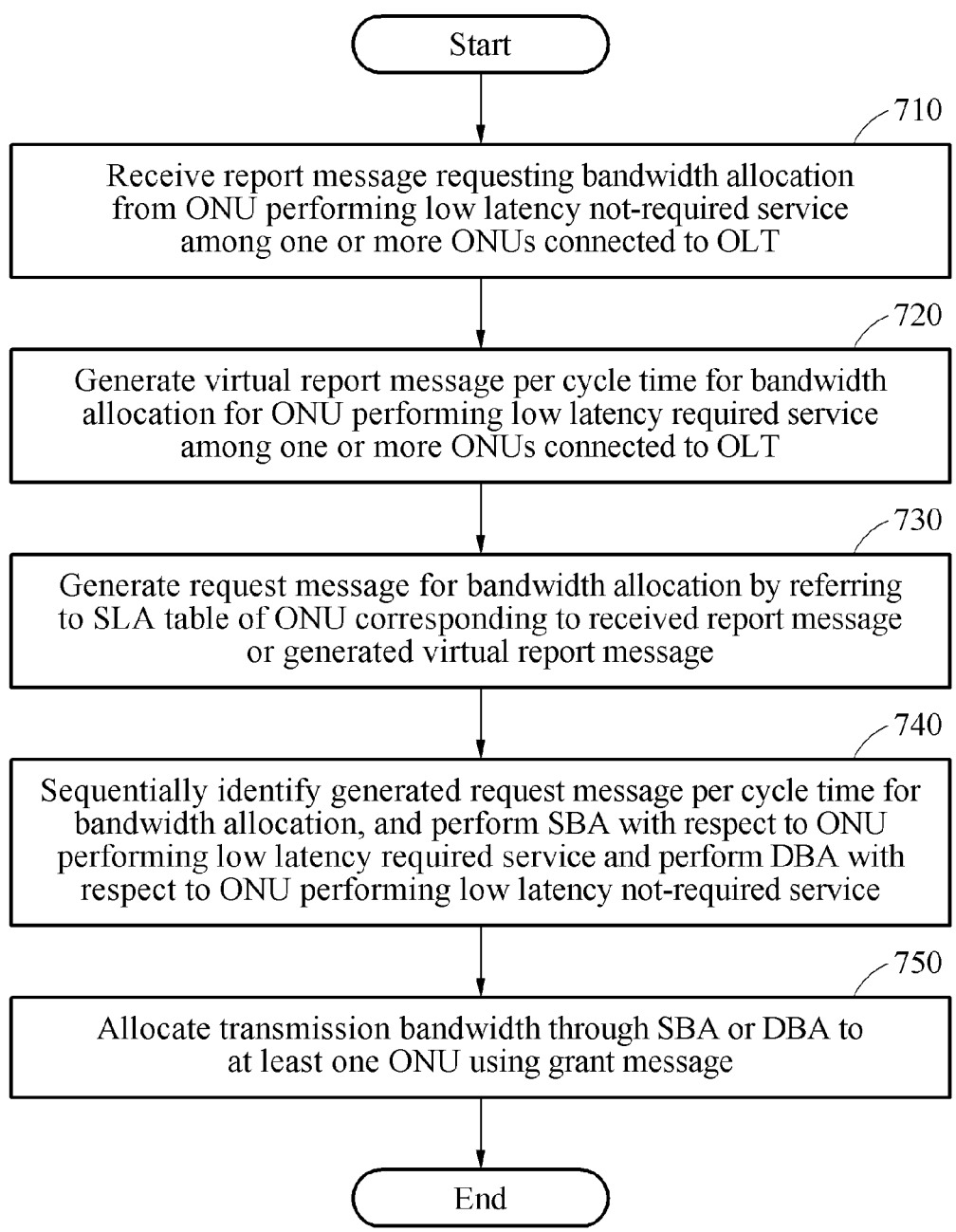
FIG. 7 is a flowchart illustrating a bandwidth allocation method according to an example embodiment.

FIG. 7 is a flowchart illustrating a bandwidth allocation method according to an example embodiment.

Referring to FIG. 7, in operation 710, the bandwidth allocation apparatus 500 may receive a report message requesting a bandwidth allocation from an ONU performing a low latency not-required service among one or more ONUs connected to the OLT.

In operation 720, the bandwidth allocation apparatus 500 may generate a virtual report message per cycle time for bandwidth allocation for an ONU performing a low latency required service among the one or more ONUs connected to the OLT.

In operation 730, the bandwidth allocation apparatus 500 may generate a request message for the bandwidth allocation by referring to an SLA table of an ONU corresponding to the received report message or the generated virtual report message. In detail, the bandwidth allocation apparatus 500 may generate, store, and output the respective request messages through the corresponding virtual report management module, received report management module, and divided report management module.

For example, the virtual report management module may generate a virtual report message for each ONU based on a credit corresponding to Class1 of the SLA table per cycle time for bandwidth allocation and may store the generated virtual report message in the memory of the virtual report management module based on a FIFO basis. Also, the virtual report management module may generate the first request message by sequentially outputting the virtual report message from the memory per cycle time.

The received report management module may store a report message received from each of ONUs performing a low-latency not-required service in the memory based on a FIFO basis. In response to receiving an output request, the received report management module may generate the second request message based on the credits corresponding to Class2~ClassN of the SLA table and the report message stored in the memory.

When the second request message output from the received report management module is not completely processed by the bandwidth allocator 530 with respect to a requested bandwidth and is divided, the divided report management module may generate a divided report message using a bandwidth remaining after allocation and may store the generated divided report message in the memory of the divided report module based on a FIFO basis. In response to receiving an output request, the divided report management module may generate the third request message by sequentially outputting the divided report message stored in the memory.

In operation 740, the bandwidth allocation apparatus 500 may sequentially identify the generated request message per cycle time for bandwidth allocation, and may perform an SBA with respect to the ONU performing the low latency required service and perform a DBA with respect to the ONU performing the low latency not-required service.

In detail, the bandwidth allocation apparatus 500 may complete an SBA operation using the first request message received from the virtual report management module and may allocate a static bandwidth to each of ONUs performing the low-latency required service. Here, the bandwidth allocation apparatus 500 may determine a total sum of allocated static bandwidths not to exceed the allocation bandwidth corresponding to the cycle time.

Once the first request message is all processed, the bandwidth allocation apparatus 500 may complete a DBA operation using the third request message received from the divided report management module and may allocate a dynamic bandwidth to each of ONUs performing the low-latency not required service.

Once the third request message is all processed, the bandwidth allocation apparatus 500 may complete the DBA operation using the second request message received from the received report management module and may allocate a dynamic bandwidth to each of the ONUs performing the low-latency not-required service. Here, the bandwidth allocation apparatus 500 may allocate, to a corresponding ONU, a relatively small value between a bandwidth length requested in the second request message or the third request message and a credit for each class of an SLA table.

In operation 750, the bandwidth allocation apparatus 500 may allocate the transmission bandwidth through the SBA or the DBA to at least one ONU using a grant message.

Figure 8:
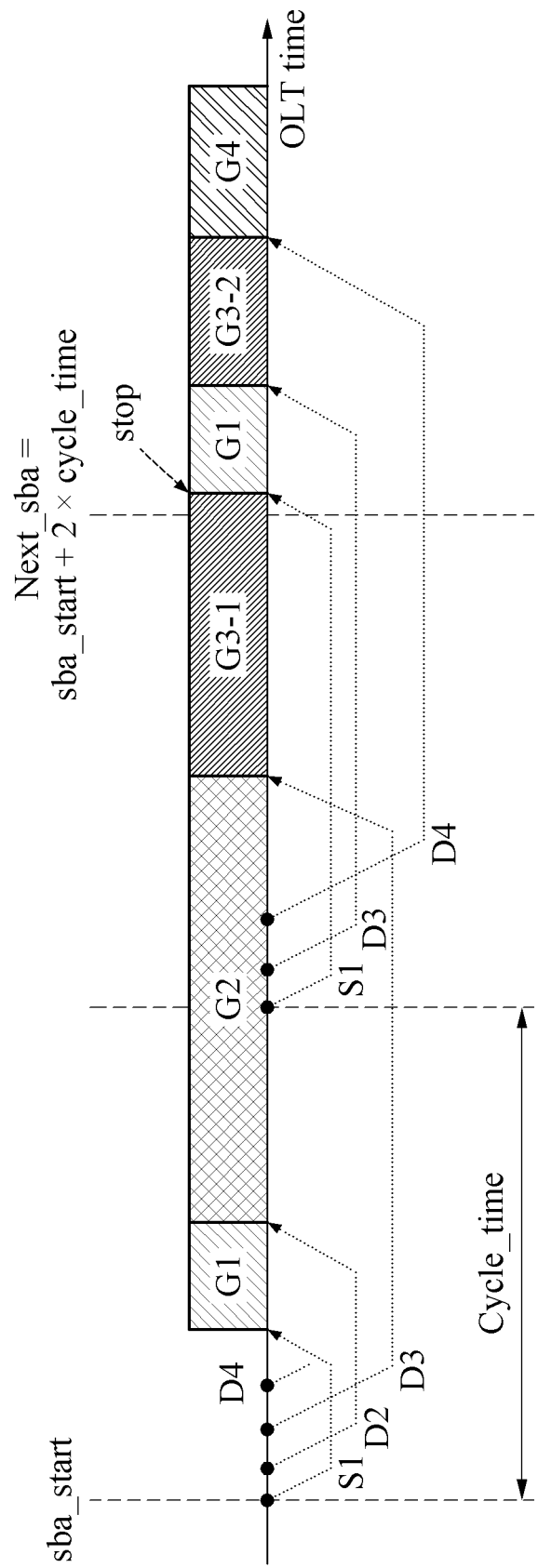
FIG. 8 illustrates an example of describing a bandwidth allocation scheme according to an example embodiment.

FIG. 8 illustrates an example of describing a bandwidth allocation scheme according to an example embodiment.

Hereinafter, an operational principle of SBA and DBA according to an example embodiment to provide a low-latency service will be described with reference to FIG. 8. A bandwidth allocation for all of the ONUs is performed for each class of a corresponding ONU. Therefore, although a single ONU may use all of Class1 to ClassN, it is assumed that ONU1 operates through the SBA and ONU2 to ONU4 operate through the DBA for clarity of description. That is, it is assumed that ONU1 uses only Class1 and ONU2 to ONU4 use only Class2.

Referring to FIG. 8, S1 represents an operation of calculating the SBA using a first request message to allocate a transmission bandwidth to ONU1, and D2 represents an operation of calculating the DBA using a second request message to allocate a transmission bandwidth to ONU2. Also, D3 represents an operation of calculating the DBA using a second request message to allocate a transmission bandwidth to ONU3 and D4 represents an operation of calculating the DBA using the second request message to allocate a transmission bandwidth to ONU4.

Initially, an SBA calculation operation may start ahead of a DBA calculation operation every cycle time. In FIG. 8, SBA is indicated with S1. A first allocation bandwidth G1 calculated through the SBA may be allocated to ONU1. An actual allocation time calculated through the SBA is not static and may vary within a predetermined period of time, based on, for example, an RTT of ONU1, an SBA allocation length, and a previous DBA allocation length.

DBA calculation corresponding to D2 starts and a second allocation bandwidth G2 calculated through the DBA does not exceed a start time of a next SBA allocation period (next_sba). Therefore, the second allocation bandwidth G2 is allocated to ONU2 and a report message requesting a bandwidth allocation is requested to ONU2. Although "start time of next SBA allocation period (next_sba)=start time of current SBA allocation time (sba_start)+2×cycle_time" is defined herein, it is provided as an example only. The start time of the next SBA allocation period may be set based on an integer multiple of the cycle time.

DBA calculation corresponding to D3 starts in the same manner as D2, however, may stop when an allocation bandwidth G3 calculated through the DBA exceeds the start time of the next SBA allocation period (next_sba). An allocation bandwidth (G3-1) that is a DBA result until the DBA operation stops may be primarily allocated to ONU3. Here, a report message requesting a bandwidth allocation is not requested to ONU3. An allocation bandwidth excluding the primarily allocated allocation bandwidth (G3-1) from the DBA calculation result for ONU3 may be updated with a remaining allocation bandwidth and stored in the divided report management module of the report manager 520. Here, the remaining allocation bandwidth may be stored in a form of the divided report message.

Since D4 exceeds the SBA allocation period that is an allocable bandwidth in a first cycle time, the DBA calculation operation may not start. Accordingly, a second request message for the DBA calculation of D4 is not output from the report manager 520.

When a start time of a second cycle time (sba_start+cycle_time) starts, the SBA allocation bandwidth G1 may be reallocated to ONU1 using the first request message received from the virtual report management module of the report manager 520. Here, since the second cycle time is all reserved, the SBA allocation bandwidth G1 may be allocated to a bandwidth corresponding to a third cycle time.

A remaining allocation bandwidth (G3-2) of ONU3 may be secondarily allocated using the third request message received from the divided report management module of the report manager 520 and a report message requesting a bandwidth allocation is requested to ONU3. If the remaining allocation bandwidth still remains after the third cycle time, allocation may be performed through tertiary, quartic division until the remaining allocation bandwidth is all used.

Once all of the first request message and the third request message stored in the virtual report management module and the divided report management module are processed, the second request message may be received from the received report management module and processed. Accordingly, an allocation bandwidth G4 may be allocated to ONU4 through DBA calculation of D4 and a report message requesting a bandwidth allocation is requested to ONU4.

Figure 9:
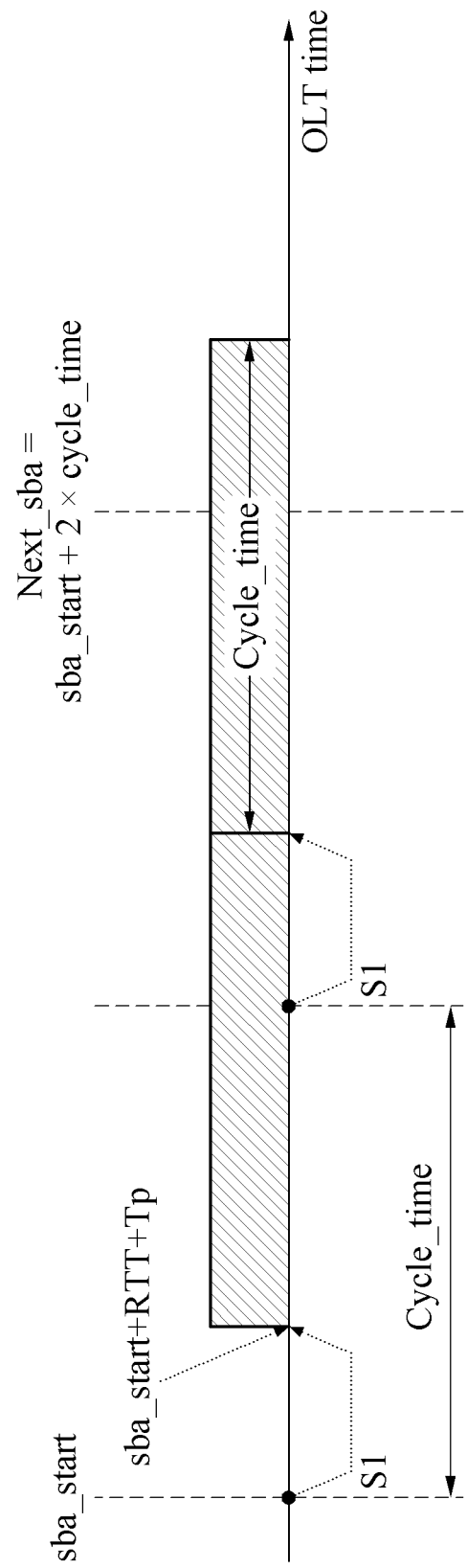
FIG. 9 illustrates another example of describing a bandwidth allocation scheme according to an example embodiment.

FIG. 9 illustrates another example of describing a bandwidth allocation scheme according to an example embodiment.

Although a static bandwidth is allocated in such a manner that all of ONUs use only Class1, the same algorithm as in FIG. 8 may be applied herein. Referring to FIG. 9, when a total sum of credits of Class1 of all of the ONUs included in an SLA table is set to be 1 cycle time or less, an SBA bandwidth may be allocated without wasting a bandwidth during (bandwidth length calculation time (Tdba)+message transmission time through optical cable (RTT)+transmission preparation time (Tp) of ONU.

According to example embodiments, it is possible to guarantee low-latency requirements and to improve a network utilization rate by allocating a static bandwidth to an ONU requiring low latency within an allocable bandwidth and by allocating a dynamic bandwidth to an ONU not requiring the low latency within a remaining bandwidth.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A bandwidth allocation method performed by a bandwidth allocation apparatus included in an optical line terminal (OLT), the bandwidth allocation method comprising:
   receiving a report message requesting a bandwidth allocation from an optical network unit (ONU) performing a low latency not-required service among one or more ONUs connected to the OLT;
   generating a virtual report message per cycle time for bandwidth allocation for an ONU performing a low latency required service among the one or more ONUs connected to the OLT;
   generating a request message for the bandwidth allocation by referring to a service level agreement (SLA) table of the ONU corresponding to the received report message;
   generating a request message for the bandwidth allocation by referring to the service level agreement (SLA) table of the ONU corresponding to the generated virtual report message;
   sequentially identifying the generated request message per cycle time, and performing a static bandwidth allocation (SBA) with respect to the ONU performing the low latency required service and performing a dynamic bandwidth allocation (DBA) with respect to the ONU performing the low latency not-required service; and
   allocating a transmission bandwidth through the SBA or the DBA to the one or more ONUs using a grant message,
   wherein the allocating of the transmission bandwidth comprises preferentially allocating a static bandwidth through the SBA within an allocable bandwidth corresponding to the cycle time and allocating a dynamic bandwidth through the DBA with respect to a remaining bandwidth.

2. The bandwidth allocation method of claim 1, wherein:
   each ONU is configured to include a different queue for each service having priority and to store uplink data for each queue, and
   the SLA table is set based on at least one of a credit of a queue for performing the SBA among a plurality of queues included in each of the one or more ONUs connected to the OLT, a credit of a queue for performing the DBA, and a round trip time (RTT) of the report message and the grant message.

3. The bandwidth allocation method of claim 1, wherein the generating of the request message comprises:
   generating a first request message for each ONU performing the low-latency required service using a virtual report message that is generated based on a credit of a queue for performing the SBA included in the SLA table per cycle time; and
   generating a second request message for each ONU performing the low-latency not-required service based on a credit of a queue for performing the DBA included in the SLA table and the received report message.

4. The bandwidth allocation method of claim 3, wherein the allocating of the transmission bandwidth comprises allocating the static bandwidth through the SBA with respect to each ONU performing the low-latency required service in response to the generated first request message, and determining a total sum of the allocated static bandwidths not to exceed the allocable bandwidth corresponding to the cycle time.

5. The bandwidth allocation method of claim 3, wherein the allocating of the transmission bandwidth comprises allocating the dynamic bandwidth through the DBA with respect to each ONU performing the low-latency not-required service in response to the generated second request message, and determining the allocated dynamic bandwidth based on the allocable bandwidth corresponding to the cycle time.

6. The bandwidth allocation method of claim 5, wherein:
the allocating of the transmission bandwidth comprises dividing the determined dynamic bandwidth based on an end point in time of the allocable bandwidth when the dynamic bandwidth determined for a single ONU among the ONUs to which the dynamic bandwidth is allocated through the DBA exceeds the allocable bandwidth, and determining a dynamic bandwidth before the end point in time as a transmission bandwidth for the single ONU, and
the generating of the request message comprises generating a third request message for reallocating a dynamic bandwidth after the end point in time to the single ONU.

7. The bandwidth allocation method of claim 1, wherein the allocable bandwidth is set based on an integer multiple of the cycle time.

8. A bandwidth allocation apparatus included in an optical line terminal (OLT), the bandwidth allocation apparatus comprising:
a communication module configured to receive a report message requesting a bandwidth allocation from an optical network unit (ONU) performing a low latency not-required service among one or more ONUs connected to the OLT, and to transmit, to the one or more ONUs, a grant message including a transmission bandwidth allocated in response to the report message;
a report manager configured to generate a virtual report message per cycle time for bandwidth allocation for an ONU performing a low latency required service among the one or more ONUs connected to the OLT, and to generate a request message for the bandwidth allocation by referring to a service level agreement (SLA) table of an ONU corresponding to the received report message or the generated virtual report message; and
a bandwidth allocator configured to sequentially identify the generated request message per cycle time, and to perform a static bandwidth allocation (SBA) with respect to the ONU performing the low latency required service and to perform dynamic bandwidth allocation (DBA) with respect to the ONU performing the low latency not-required service,
wherein the bandwidth allocator is configured to preferentially allocate a static bandwidth through the SBA within an allocable bandwidth corresponding to the cycle time and to allocate a dynamic bandwidth through the DBA with respect to a remaining bandwidth.

9. The bandwidth allocation apparatus of claim 8, wherein:
each ONU is configured to include a different queue for each service having priority and to store uplink data for each queue, and
the SLA table is set based on at least one of a credit of a queue for performing the SBA among a plurality of queues included in each of the one or more ONUs connected to the OLT, a credit of a queue for performing the DBA, and a round trip time (RTT) of the report message and the grant message.

10. The bandwidth allocation apparatus of claim 8, wherein the report manager is configured to generate a first request message for each ONU performing the low-latency required service using a virtual report message that is generated based on a credit of a queue for performing the SBA included in the SLA table per cycle time, and to generate a second request message for each ONU performing the low-latency not-required service based on a credit of a queue for performing the DBA included in the SLA table and the received report message.

11. The bandwidth allocation apparatus of claim 10, wherein the bandwidth allocator is configured to allocate the static bandwidth through the SBA with respect to each ONU performing the low-latency required service in response to the generated first request message and to determine a total sum of the allocated static bandwidths not to exceed the allocable bandwidth corresponding to the cycle time.

12. The bandwidth allocation apparatus of claim 10, wherein the bandwidth allocator is configured to allocate the dynamic bandwidth through the DBA with respect to each ONU performing the low-latency not-required service in response to the generated second request message, and to determine the allocated dynamic bandwidth based on the allocable bandwidth corresponding to the cycle time.

13. The bandwidth allocation apparatus of claim 12, wherein:
the bandwidth allocator is configured to divide the determined dynamic bandwidth based on an end point in time of the allocable bandwidth when the dynamic bandwidth determined for a single ONU among the ONUS to which the dynamic bandwidth is allocated through the DBA exceeds the allocable bandwidth corresponding to the cycle time, and to determine a dynamic bandwidth before the end point in time as a transmission bandwidth for the single ONU, and
the report manager is configured to generate a third request message for reallocating a dynamic bandwidth after the end point in time to the single ONU.

14. The bandwidth allocation apparatus of claim 8, wherein the allocable bandwidth is set based on an integer multiple of the cycle time.

* * * * *